May 2, 1967 H. WALDBURGER 3,316,708
MECHANICAL RESONATOR FOR NORMAL FREQUENCY
OSCILLATORS IN TIME MEASURING DEVICE
Filed July 26, 1965
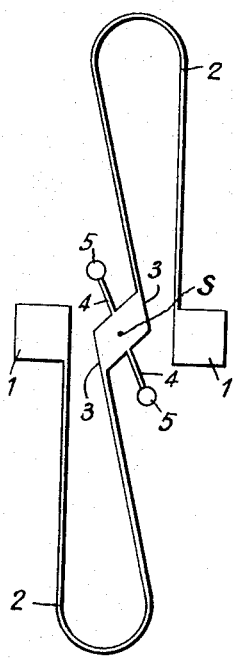
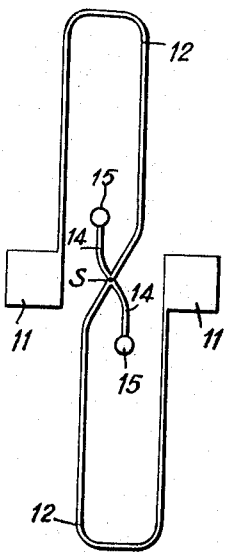
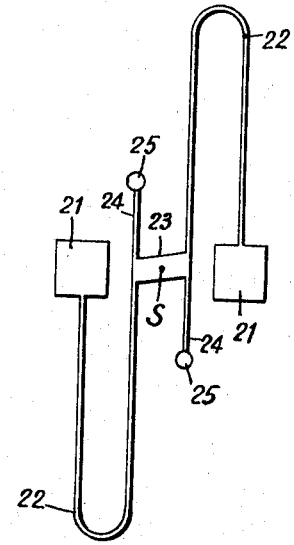
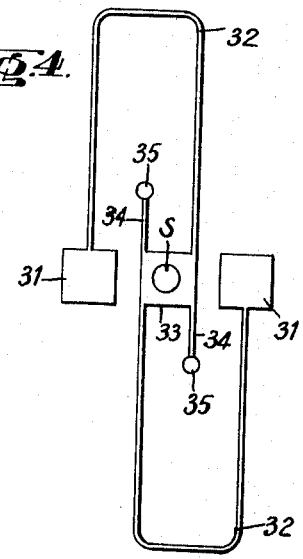
Heinz Waldburger,
Inventor
By Wenderoth, Lind and Ponack,
Attorneys United States Patent Office 3,316,708
Patented May 2, 1967

3,316,708
MECHANICAL RESONATOR FOR NORMAL FREQUENCY OSCILLATORS IN TIME MEASURING DEVICE
Heinz Waldburger, Neuchatel, Switzerland, assignor to Centre Electronique Horloger, Neuchatel, Switzerland, a corporation of Switzerland
Filed July 26, 1965, Ser. No. 474,802
Claims priority, application Switzerland, July 31, 1964, 10,061/64
5 Claims. (Cl. 58—23)

The use of a mechanical resonator for standard frequency oscillators in simple time measuring devices depends on four essential characteristics: (1) low frequency, (2) small position error, (3) high isochronism and (4) high quality factor.

When using the best known resonator, the tuning fork, a position error occurs which, for frequencies below ca.1 kHz. is notably greater than the remaining errors. Various resonators have been therefore developed which, owing to their shape, are not affected by any position error whatsoever. For the family of resonators of two masses and two springs, the following possibilities are given for the elimination of the position error:

(1) The symmetry of the resonator has the effect that the resonance motion of the two masses lies on a common straight line. Owing to this the influence of any eventual gravitational field is completely eliminated.

(2) Mutual compensation of the position influences. By this is to be understood that one half of the resonator is accelerated by the same amount as the other half is slowed down.

Owing to the mechanical coupling of the two halves of the resonator the frequencies which have been slightly modified by the gravitational forces get mixed, and the resonator oscillates independently of its position, provided that the two amplitudes are equal.

The mechanical resonator for standard frequency oscillators in time measuring devices according to the invention comprises two substantially U-shaped spring vibrators, two masses, means for securing the resonator in the time measuring device, elastic holders, each spring vibrator having a free end carrying one of said masses, the other ends being connected together so that both U-shaped springs form the general shape of an "S," said holders being arranged to connect elastically the middle of said "S" to said securing means, and all parts of the resonator being arranged and shaped dynamically centrally symmetrically in relation to the center of gravity of the resonator.

The two parts of the resonator are thus arranged geometrically and/or dynamically centrally symmetrically in relation to the centre of gravity of the resonator, and in this case the resonance motion is such that at any moment the position of the masses varies exactly centrally symmetrically. This means that the centre of gravity of the resonator (when the amplitudes of its two halves are equal) remains exactly stationary. The resultants of the forces of inertia of the two halves of the resonator do not however act exactly on a common straight line. Owing to this the two masses are subjected to supplementary positive, respectively negative accelerations depending on their position in the gravitational field. These unequal influences on the frequency are compensated owing to the resilient holding of the two parts of the resonator. In addition, the forces of inertia produce a small parasitic torque relative to the centre of gravity, which oscillates at double the frequency of the resonator.

The following embodiments given by way of examples of the resonator according to the invention are described with reference to the accompanying drawings.

FIGURES 1–4 each illustrates an embodiment.

In the embodiment illustrated in FIG. 1, the two identical masses 1 are each connected centrally symmetrically relative to the centre of gravity S with each of the identical springs 2. The arrangement of the general shape of the springs as well as of the cross-sections is subjected to no other conditions than that the bearing reactions, which oscillate with double the frequency of the resonator, must be reduced to a magnitude of the second order, and that in addition the local stresses in the material must be kept within favourable limits. The centrally symmetrical springs 2, which carry the masses 1, are connected together and to the securing point 5 by a coupling member 3 and two elastic holders 4. The connection between the two halves of the resonator is effected hereby the coupling member 3 and is not directly influenced by the securing points 5.

The resilient mounting of the coupling members 3 by means of the elastic holders 4 has the effect that the vibration in phase of the resonator lies somewhat below the vibration in opposition required for the measurement of time. The unavoidable constructive and material inequalities in the two resonator halves are thus compensated. The unequal influences of the gravitational field are compensated by the elastic holders 4.

The embodiment shown in FIG. 2 differs from the previous one in that the two springs 12 are connected directly together and therefore the coupling member merges constructively at S with the springs. The elastic holders 14 provide the connection with the securing means 15 and have the same function as that described above.

In FIG. 3 another embodiment of the coupling and holding members is shown. Here the coupling member 23 connnects the two springs 22, which are each prolonged by the elastic holders 24 which lead to the securing points 25.

FIG. 4 shows an embodiment with springs 32, carrying masses 31, which springs are bent in relation to the securing points 35 in the direction opposite to that shown in FIG. 3. In addition the coupling member 33 is provided with a hole which may serve as a passage for an indicating mechanism. Two elastic holders 34 connect the coupling member 33 to the securing points 35. Each holder 34 is in alignment with a fixed end of a spring 32.

The resonator according to the invention need not have an exactly symmetrical geometric shape, it is sufficient if it is dynamically symmetrical in relation to the center of gravity S.

What I claim is:

1. Mechanical resonator for a standard frequency oscillator in a time measuring device, said resonator comprising two substantially U-shaped spring vibrators, two masses, means for securing the resonator in the time measuring device, elastic holders, each spring vibrator having a free end carrying one of said masses, the other ends of said spring vibrators being connected so that together the U-shaped springs form the general shape of an "S," said holders connecting elastically the middle of said "S" to said securing means, and all parts of the resonator being arranged and shaped dynamically centrally symmetrically in relation to the center of gravity of the resonator.

2. A resonator according to claim 1, wherein said U-shaped spring vibrators are connected together by means of a rigid coupling member connected to said elastic holders.

3. A resonator according to claim 2, wherein all vibrating parts are made of the same material.

4. Mechanical resonator for a standard frequency oscillator in a time measuring device, said resonator comprising two substantially U-shaped spring vibrators, two masses, two securing means for securing the resonator to the time measuring device, two elastic holders, and a rigid coupling member surrounding the center of gravity of the resonator, each spring vibrator having a free end carrying one of said masses, the other ends being connected to said coupling member so that both spring vibrators form together the general shape of an "S," each of said holders being fixed opposite a spring vibrator end to said coupling member in such a manner that each holder is in substantial alignment with the fixed end of one of the spring vibrators and that each of the latter overlaps one of said holders, and all parts of the resonator being arranged and shaped dynamically centrally symmetrically in relation to the center of gravity of the resonator.

5. A resonator according to claim 4, wherein all parts are made of the same material.

References Cited by the Examiner

UNITED STATES PATENTS 3,192,701 7/1965 Tanaka et al. ---------- 58—23
3,201,932 8/1965 Sparing et al. ---------- 58—23

RICHARD B. WILKINSON, *Primary Examiner.*

G. F. BAKER, MICHAEL L. LORCH,
*Assistant Examiners.*